Patented July 17, 1934

1,966,460

UNITED STATES PATENT OFFICE 1,966,460

MANUFACTURE OF MILK-CONTAINING PRODUCTS

Herbert E. Otting, Westerville, Ohio, assignor to M. & R. Dietetic Laboratories, Inc., a corporation of Ohio No Drawing. Application August 28, 1931, Serial No. 560,050. Renewed October 11, 1933

13 Claims. (Cl. 99—11)

The present invention relates to improvements in the manufacture of milk-containing products and more particularly in the manufacture of confections such as milk chocolate, butter-cream candies, various bakery products and the like, in which a distinctive and permanent butter or milk-like flavor is desired in the final product, and likewise in the manufacture of milk products for use in the preparations of such materials.

In the manufacture of milk chocolate and other confectionery in which a distinctive milk or butter flavor is desired, there has been considerable variability in the flavors developed in the final product when using milk solids or other butter-fat-containing materials from different sources, or even different lots from the same source. Furthermore, in some cases, when the chocolate or other material is first made and has the desired distinctive milk or powder flavor, the latter is found to be unstable or evanescent in character, and to disappear after a short time. I have found that, by operating in accordance with the present invention, the development of the desired milk or butter flavor may be controlled, a substantially constant product secured, and the desired flavor characteristics stabilized in the final product.

In accordance with the present invention, I employ in the preparation of the chocolate or other material a milk product containing at least part of its butter-fat content in lipolyzed form. The lipolysis of the butter-fat may be effected by bacterial action or preferably by the use of lipolytic enzymes. While the lipolytic action may be carried out on the whole milk or other liquid milk product which is to be used ither as such or in evaporated or desiccated form as a constituent in the manufacture of the chocolate or other confection or food material, I prefer to carry out the lipolysis upon a more concentrated butter-fat-containing material, such as cream or an artificial emulsion of butter-fat which is later incorporated in any suitable manner with the milk fluid to be used, either in its original or desiccated form; or the lipolyzed butter-fat containing material may be separately evaporated or desiccated and the resulting product admixed with other milk fluids, or evaporated or desiccated products therefrom. The desired proportion of the lipolyzed butter-fat containing material may be incorporated on such a basis with respect to the total of milk solids as to secure, to any desired extent, the characteristic milk or butter flavor in the final product.

While I may employ lipase in the treatment of the butter-fat containing material in accordance with this invention, I prefer to employ a suitable lipolytic enzyme which is more readily commercially available, such as steapsin, derived from the pancreatic glands of edible animals. I have found the following procedure suitable for use in effecting the lipolysis of the butter-fat containing material.

A separated cream, suitably containing in excess of 15% butter-fat and preferably about 40%, is heated to 190° F. for a short period to reduce as far as is possible its content of bacterial organisms, particularly of the non-spore forming type. The cream is then cooled to between 100° and 110° F. and is inoculated with a suitable proportion of powdered steapsin, previously thoroughly dissolved in a small quantity of water. The proportion of steapsin used is determined to secure the desired extent of lipolysis. In general, from 0.05% to 0.2% is sufficient, and I have found about 0.1% of an average commercial product to be adequate in the treatment of 40% butter-fat cream. The cultured cream is maintained between 100° and 110° F. for a period sufficient to secure a development of at least 5 to 6%, and preferably about 12 to 13% of free fatty acids (calculated as oleic acid). Ordinarily a culture period of about twenty-four hours is sufficient to secure the desired development of free fatty acids. It is readily apparent that when a higher proportion of free fatty acids is desired to be secured, the period of lipolysis may be extended or the proportion of the lipolytic enzyme increased.

After the desired proportions of free fatty acids have been developed, the treated cream, preferably after dilution to about 20% fat content, is heated to a temperature such that the lipolytic enzyme is destroyed. This may be accomplished by heating to a temperature of 150° to 160° F. for about thirty minutes. The lipolyzed material is then cooled to about 120° F. or lower, and may then be incorporated with milk, skim milk or other milk fluids to secure a desired final product which may be incorporated into the chocolate or other constituents of the final product as such; or it may be evaporated or dried to a powder, and the evaporated or dried product may be mixed with the other constituents of the food product such as chocolate, butter-creams, or the like. In general, the milk fluid constituents combined with the lipolyzed butter-fat product are proportioned so that the latter constitute from 5 to 10% of the milk solids in the final product.

The following example sets forth a specific operation in accordance with this invention, it being understood that the details set forth are not intended to be regarded as limitations upon the scope of the invention, but as merely illustrative thereof.

325 pounds of 40% butter-fat cream are heated to a high temperature for destruction of bacteria, say 190° F., for approximately thirty minutes and are then cooled to from 103 to 105° F., and are inoculated with 151 grams of steapsin dissolved in a small amount of water. The temperature is maintained for a period sufficient for the development of the desired amount of free fatty acids. At the end of twenty-two hours, titration showed the content of free fatty acids (calculated as oleic acid) to be 13.1%, the cream at this time having a highly penetrating, accentuated, butter-like odor. The lipolyzed cream is then diluted with 50% of its weight in water and heated to 155° F. for thirty minutes to destroy the enzymes and cooled.

The admixture of the solids of the lipolyzed cream and the other milk solids which are desired to be incorporated in the final elementary product may then be effected in any desired manner. For example, the lipolyzed cream product produced as above described may be cooled somewhat, say to about 120° F. and mixed with a concentrated or evaporated skim milk (condensed 3½ to 1) containing 2,220 pounds of solids, the resulting fluid then being dried in any desired manner, for example, in a centrifugal or pressure spray drier, to a powder. The total yield of the powdered product amounts to 2,370 pounds of solids containing 5.4% butter-fat. The resulting low fat powder is then utilized in the formation of a composite milk powder having its butter-fat and total solids in substantially the relation existing in whole milk, suitably as described in my prior application Serial No. 454,520, filed May 21, 1930, issued as Patent No. 1,882,028 of October 11, 1932; for example, the dried product may be combined with a dried cream powder containing 74.5% butter-fat in the ratio of 283 pounds of the former to 135 pounds of the latter, thereby forming a powder containing about 26.5% butter-fat (including free fatty acids).

It is readily apparent that the blending and admixture of the lipolyzed cream product, or its solids, with the other milk solids to be incorporated in the alimentary product, may be effected in any desired manner. For example, it may be separately dried, suitably after dilution, and the dried lipolyzed cream powder mixed with varying proportions of cream powder and skim milk powder or whole milk powder to secure the desired relations of fat to the solid constituents, or the fluid lipolyzed cream may be admixed with other milk fluids, either in their natural form or after concentration or evaporation, and the resulting mixed fluid dried, or it may be incorporated without drying in the production of the final milk product. For certain uses, it is particularly desirable to employ a powdered product secured as above specifically set forth, by blending the dried products resulting from the drying of a product containing in excess of 7.50% butter-fat and a product containing a fat content not greater than and preferably lower than that of whole milk, as set forth more fully in my prior application above referred to. For example, such a product is particularly desirable in the manufacture of chocolate, as thereby a more effective blending of the fat constituents of the milk solids and of the chocolate is secured on conching.

For example, a milk chocolate batch may be prepared by conching 12 to 25% and suitably 15 to 16% of the powder product above described, containing about 26.5% butter-fat, with 9 to 10% cocoa mass, 45 to 50% sugar and 22 to 28% cocoa butter. The mixture is subjected to the usual mixing and refining operations in the manufacture of chocolate and is found to have a definite and slightly accentuated milk, or butter flavor which is permanent and stable and does not disappear in the further handling of the milk chocolate, for example, in casting, dipping, or in storage of the final product. It will be readily apparent that the lipolyzed butter-fat material may be incorporated into the chocolate mixture or other alimentary product in its original form, without concentration of its solids, and if the removal of part or all of its water content is desired, it can be effected during the preparation and mixing of the chocolate or other material, as is frequently customary.

In carrying out the lipolysis in accordance with the present invention, it is preferred that the butter-fat containing fluid be subjected to the action of the lipolytic enzymes while in non-alkaline state, as I find that thereby the development of foreign or undesirable flavors such as soapiness or tallowy flavor may be avoided.

The butter-fat containing fluids subjected to lipolysis in accordance with this invention may be, instead of a cream of other natural fat-containing product, an emulsion prepared from butter-fat, or it may, if desired, contain varying proportions of other fats as well. The lipolyzed product, either alone or blended with other milk fluids to secure a product having the fat proportions of whole milk, may be incorporated into a variety of alimentary products in which a characteristic butter-flavor is desired; for example, in salt-rising bread or other bakery products, or in oleomargarines, mayonnaise and other salad dressings, and in milk products which are to be employed in the manufacture of certain cheese products. As pointed out hereinbefore, it is particularly desirable in the manufacture of milk and butter-chocolate products in that it produces permanent and characteristic butter-flavor which persists through the various stages of manufacture and use of the chocolate in the final product.

I claim:

1. The method of imparting a characteristic and permanent butter-flavor to chocolate which comprises incorporating therewith lipolyzed butter-fat.

2. The method of imparting a characteristic and permanent butter-flavor to chocolate which comprises incorporating therewith milk solids including lipolyzed butter-fat.

3. The method of producing a butter-flavor in chocolate products which comprises subjecting a butter fat-containing aqueous fluid to lipolysis to develop therein additional free fatty acids, stabilizing the butter fat-containing lipolyzed fluid to prevent further lipolytic activity therein while retaining the fatty acids formed therein, and incorporating the resulting constituents thereof in the chocolate product.

4. The method of producing a material having an accentuated butter-flavor which comprises subjecting a butter fat-containing aqueous fluid to lipolysis to develop therein at least 5 to 6% free fatty acids, destroying the lipolytic agent while retaining the fatty acids therein and incorporating the solids thereof with milk product containing non-fat milk solids.

5. The method of preparing a material for imparting butter-flavor to alimentary products which comprises subjecting a butter fat-containing aqueous fluid while in non-alkaline condition to the action of a lipolytic enzyme, destroying the lipolytic enzyme while retaining the resulting fatty acids in the fluid, and incorporating a milk fluid containing non-fat solids therewith.

6. The method of preparing a material for imparting butter flavor to alimentary products which comprises subjecting a butter fat-containing aqueous fluid in non-alkaline condition to lipolysis to develop therein additional free fatty acids, destroying the lipolytic agent while retaining the fatty acids of the fluid, incorporating a milk fluid containing a proportion of non-fat solids at least as high as that of normal milk therewith and drying the mixture.

7. The method of preparing a material for imparting butter-flavor to alimentary products which comprises subjecting a butter fat-containing aqueous fluid to lipolysis to develop therein additional free fatty acid, destroying the lipolytic agent while retaining the free fatty acids of the fluid admixing the lipolyzed fluid with a low-fat milk fluid, forming a mixture in which the proportion of non-fat solids is higher than in whole milk, drying the mixture and admixing the resulting solids with a desiccated milk product having a proportion of fats and total solids exceeding that of whole milk.

8. The method of preparing a material having an accentuated butter-flavor which comprises subjecting a butter fat-containing aqueous fluid to the action of steapsin while maintaining its temperature at between 100° and 110° F. to secure development of additional fatty acids therein, heating the liquid to at least 150°, thereby destroying the steapsin while retaining the free fatty acids, cooling and admixing it with additional milk fluids containing additonal milk solids.

9. The method of preparing a milk chocolate which comprises subjecting a butter fat-containing aqueous fluid to the action of a lipolytic enzyme while in non-alkaline condition to develop free fatty acids therein, destroying the lipolytic enzyme and stabilizing the free fatty acid content of the fluid, and incorporating the lipolyzed fat-including solids of said fluid into a chocolate mass.

10. The method of preparing a milk chocolate which comprises subjecting a butter fat-containing aqueous fluid to the action of a lipolytic enzyme while in non-alkaline condition to develop at least 5% free fatty acids therein, destroying the lipolytic enzyme and stabilizing the free fatty acid content of the fluid, and incorporating the lipolyzed fat-including solids of said fluid into a chocolate mass.

11. The method of preparing a milk chocolate which comprises subjecting a butter-fat to the action of a lipolytic enzyme while in non-alkaline condition to develop 12 to 13% free fatty acids therein, destroying the lipolytic enzyme and stabilizing the free fatty acid content of the fluid, and incorporating the lipolyzed fat-including solids of said fluid together with additional milk solids into a chocolate mass.

12. As a composition in matter, a chocolate mass containing milk solids including lipolyzed butter fat, said chocolate mass having a definite and permanent butter-flavor.

13. As a composition in matter, a chocolate mass containing 12 to 25% of milk solids, a portion of the fat content of which is lipolyzed to free fatty acids.

HERBERT E. OTTING.